United States Patent Office 3,311,025
Patented Mar. 28, 1967

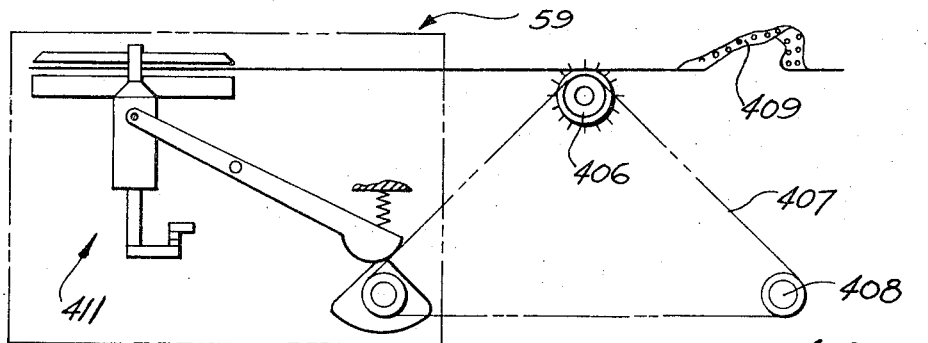
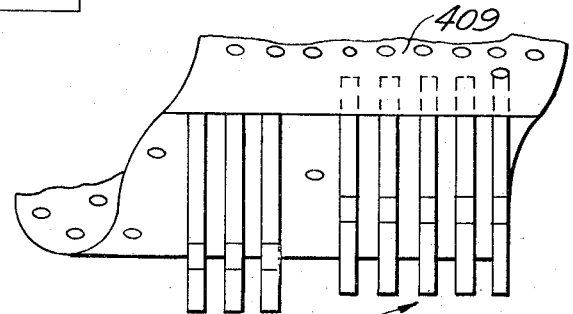
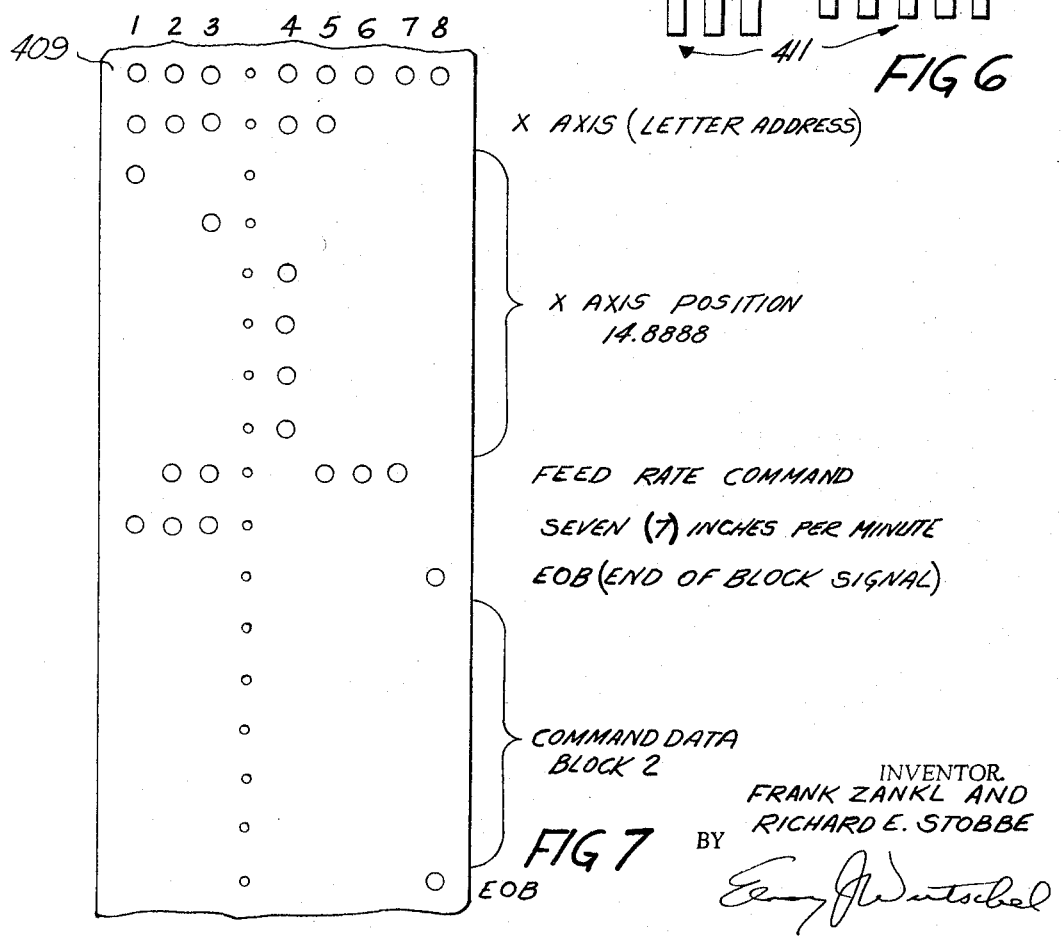
FIG 5
FIG 6
FIG 7

3,311,025
FEED RATE MODIFIER
Frank Zankl and Richard E. Stobbe, Milwaukee, Wis., assignors to Kearney & Trecker Corporation, West Allis, Wis., a corporation of Wisconsin
Filed Sept. 16, 1965, Ser. No. 487,833
23 Claims. (Cl. 90—21)

This invention relates generally to machine tool control systems, and more particularly to an automatic feed rate changing control for the feed drive mechanisms of a machine tool.

In a machine tool such as a milling machine, a cutting tool is rotated at a predetermined rate relative to the workpiece that is simultaneously moved at a predetermined feed rate relative to the rotating cutter. As is known in the art, the speed rate of the cutter and feed rate of the workpiece are preset according to a number of variable factors such as the size of the cutter, the kind of metal being machined, and the amount of metal to be removed during a particular machining operation. Irrespective of the preset rotational rate of the cutting tool and feed rate of the workpiece, overload control devices have been known and utilized in the prior art, and in the event of a predetermined degree of overload on the cutting spindle during a machining operation, the feed mechanism was stopped, permitting the cutter to free itself prior to manually readjusting the rate for continuing the machining operation. Such arrangements, although effective for single machining operations, are not adequate for automatically programmed machine tool control systems in which a plurality of different cutting tools are operated at different preset speed rates for performing machining operations upon a workpiece coordinately movable at different preset feed rates during one single machine program of operation.

A general object of this invention is to provide a feed rate controller responsive to a predetermined degree of load on a tool holding spindle during a machining operation and operative to readjust the feed rate in a manner that the machining operation proceeds to completion without the necessity of manual restarting or readjustment.

Another object of the invention is to provide an automatic rate controller particularly adapted to readjust feeding rates as required during a program of machining operations.

A further object of the invention is to provide an automatic rate controller particularly adapted for use with numerical control systems for machine tools operative to control a program of machining operations.

According to this invention, an automatic rate control is provided in a numerically controlled system operative to control a machine tool for performing a plurality of different machining operations upon a workpiece with different cutting tools. The machine tool being controlled is provided with a tool storage magazine positioned in proximity to a tool receiving spindle, and with a tool changing mechanism carried therebetween. The arrangement is such that according to the requirements of a preset machining program, the tool change mechanism is operative to interchange a tool in the tool spindle with a tool carried by the storage magazine. Likewise, depending upon the requirements of the machining program, a work supporting table is movable along selected different axes of movement at predetermined feed rates for the performance of a machining operation by the cutting tool then carried by the tool spindle. In performing a complete program of different machining operations upon a workpiece, the various feed rates and speed rates are preset for optimum conditions with respect to both the sharpness of the individual tools stored in the magazine and uniformity of the material comprising the various workpieces to be machined during different programs. In the event of a dullness in one or another of the cutting tools or variations in the hardness of the workpiece, momentary overloads may occur upon the tool spindle at various steps throughout each machining program. The present invention is operative when actuated by a predetermined degree of load upon the tool spindle to readjust the feed rate of the workpiece for the balance of that particular step in the machine program. At the completion of a particular machining step, the next block of programmed information is transmitted to the machine for performing the next step in the machine program. At this time, likewise, the control system is operative to deactuate the preset feed rate reduction adjustment that had been effected during the prior programmed step. The rate controller or modifier functions automatically to readjust feed rate during any of the program steps during which an overload condition occurs. Thus, the complete program of machining operations can be completed without manual intervention or manual presetting of any of the preset program steps.

The foregoing and other objects of the invention which will become more fully apparent from the following detailed description of exemplifying apparatus, may be achieved by the particular machine tool and machine tool control system described herein as a preferred embodiment thereof in connection with the accompanying drawings, in which:

FIG. 5 is a diagrammatic view of a tape reader and control tape for effecting predetermined program of machine operation;

FIG. 6 is an enlarged fragment of control tape in combination with switch plungers actuated thereby; and, FIG. 7 is a fragment of control tape illustrating several adjacent blocks of numerical command data together with the end of block signal for initiating the programmed movement and resetting the overload feed controller.

Figure 1:
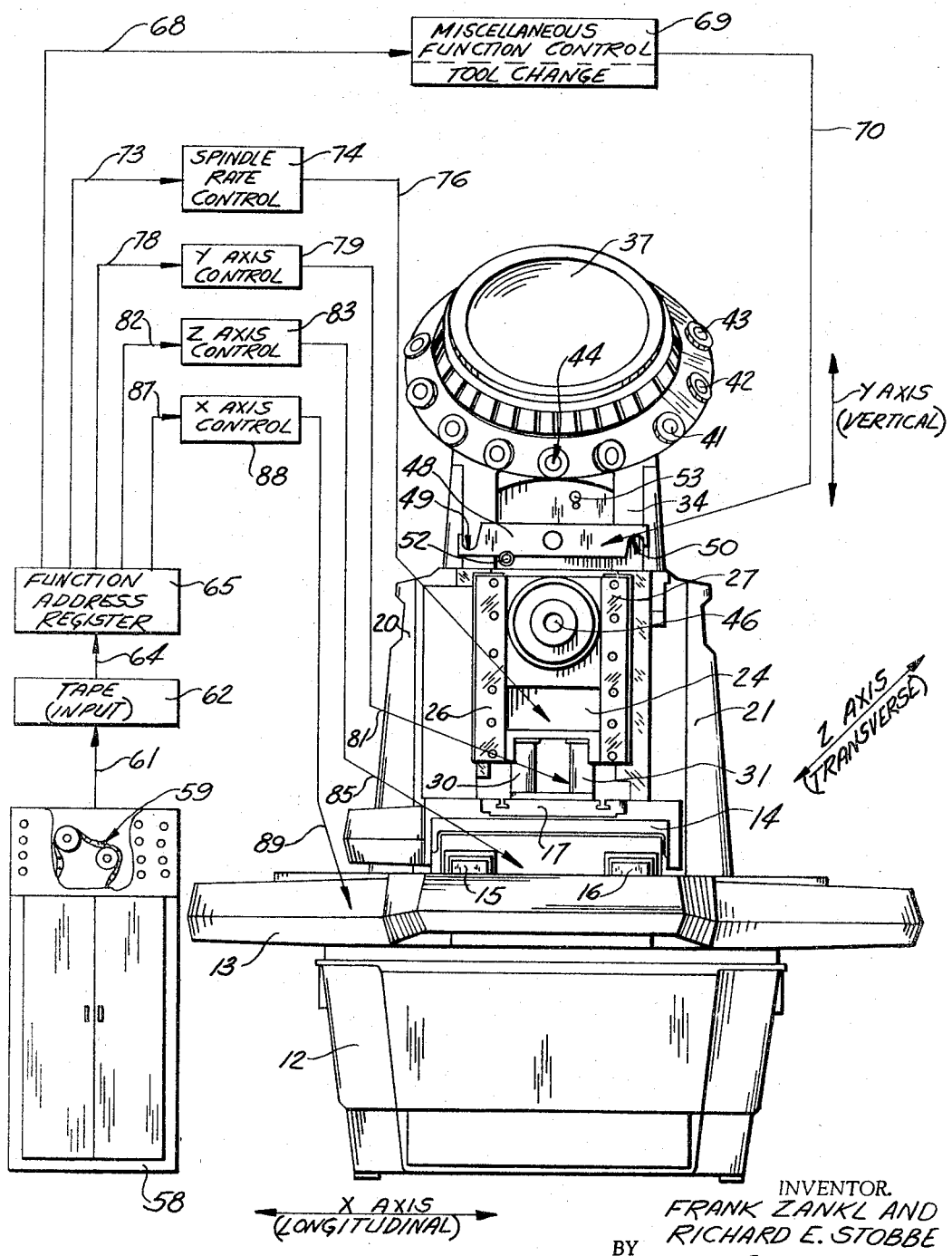
FIGURE 1 is a view in front elevation of a machine tool in combination with an associated numerical control system represented in block diagram form and incorporating a preferred form of the present invention.

Referring more particularly to the drawings, there is shown in FIGURE 1 a tool changing machine tool incorporating the present invention. As there illustrated, a supporting machine base 12 is provided on its upper surface with horizontal guideways (not shown) adapted to slidably support a saddle 13 for horizontal longitudinal movement along an X axis. The upper surface of the horizontally movable saddle 13, in turn, is provided with a pair of spaced apart, transversely extending horizontal guideways 15 and 16 that are engaged by complementary way surfaces formed on the underside of a transversely movable worktable 14. Although not necessary in the present invention, the transversely movable work supporting table 14 may be provided with a selectively indexable worktable 17, as schematically indicated in FIGURE 1 in order to indexably position a workpiece prior to a machining operation. Rearwardly of the saddle 13 and worktable 14, there are provided a pair of column uprights 20 and 21 secured at their lower ends to the base 12 and disposed to extend vertically upwardly therefrom in spaced apart parallelism, as shown in FIGURE 1. The column uprights 20 and 21 are respectively provided with vertically disposed guideways formed in spaced parallelism and adapted to slidably support a spindle carrying head 24 therebetween for selective vertical movement along a Y axis. Retaining plates 26 and 27 are secured to the spindle head 24 in well-known manner for slidably engaging the front way surfaces presented by the column uprights 20 and 21. The retaining plates 26 and 27, illustrated in FIGURE 1, are disposed to cooperate in well-known manner with rearwardly spaced way surfaces (not shown) presented by the spindle head 24. As known in the art, the respective way surfaces and guideways are so disposed as to constrain the spindle head 24 between the guiding column uprights 20 and 21 for selective vertical movement.

To effect an equalized vertical movement of the spindle head 24, a pair of spaced apart, circular elevating rods 30 and 31 are fixedly secured to the underside of the spindle head 24. A power driven elevating mechanism is operatively disposed to effect vertical movement of the two elevating rods 30 and 31 for effecting corresponding vertical movement of the spindle head 24, as will hereinafter be more fully explained.

A unitary tool changing support housing 34 is secured to the upper ends of the column uprights 20 and 21, and is provided with an angularly inclined upper face (not shown) adapted to rotatably support an indexable tool storage magazine 37. The tool storage magazine 37 is provided with a plurality of peripherally spaced tool receiving storage sockets, such as the circular tool receiving sockets 41, 42 and 43. At the start of a machining program involving tool changing, the indexable storage magazine 37 is so positioned that one of the sockets, such as the socket 44 in FIGURE 1, is in a tool changing station positioned in spaced apart parallelism above a rotatable tool receiving spindle 46 rotatably journalled in the spindle head 24. Between the tool storage socket 44 and the tool spindle 46, a tool change arm 48 is movably carried by the support housing 34 in position to effect a selective interchange of tools between a tool carried by the socket 44 and a tool carried by the tool spindle 46. As a prerequisite to effecting a tool change, the spindle head 24 is moved to its upper limit of vertical movement for positioning the tool spindle 46 for a tool change.

To accomplish a tool change, the tool change arm 48 is provided at its ends with oppositely disposed, semi-circular tool engaging grips 49 and 50. The tool change arm 48 is carried by the housing 34 for rotatable movement between a stationary stop 52 extending forwardly from the housing 34 and a stop 53 carried by the housing 34 for rectilinear, axial forward and rearward movement relative to the front face of the housing. The arrangement is such that a power driven mechanism (not shown) is operative to rotate the tool change arm 48 90° in a clockwise direction into engagement with the stop 53, with the tool engaging openings 49 and 50 respectively being moved into engagement with the tools carried by the storage socket 44 and the tool spindle 46.

Upon 90° rotation of the tool change arm 48 in a clockwise direction, the tool engaging grips 49 and 50 at the opposite ends thereof are respectively moved into engagement with a tool carried by the storage socket 44 and a tool releasably carried by the tool spindle 46. After the tool change arm 48 is rotated to engage the tools, it is caused to be moved axially forward for withdrawing the tools from their respective supporting sockets. Next, the arm 48 is rotated 180° to interchange the positions of the tools and position them for reinsertion into the magazine socket 44 and tool spindle 46. With the position of the tools now interchanged, the arm 48 is caused to be moved axially inward for reinserting the interchanged tools respectively in the tool spindle 46 and the storage socket 44. After this, the tool change arm 48 is rotated 90° in a counterclockwise direction to its parked position, FIGURE 1.

Upon return of the tool originally carried by the spindle 46 to the magazine storage socket 44, the storage magazine 37 is rotated one position in a clockwise direction for advancing the next tool into the tool change position. The arrangement is such that only the first tool of a series of tools sequentially positioned in the storage magazine 37 is coded in a manner that the coded tool is stopped at the tool change position represented by the storage socket 44 in FIGURE 1, at the start of a machining program. After each tool change operation has been completed, the storage magazine 37 is indexably advanced one position for positioning the next tool at the tool change position. This process is repeated until all of the tools that are required for a particular machining program have been actually used to perform the different required machining operations, with the tool originally carried by the tool spindle 46 returned thereto for starting the next program of machining operations. The foregoing description of the tool change mechanism is deemed sufficient for the purposes of this patent application. The mechanism for operating the tool storage magazine 37 and the tool change arm 48 is more fully described in copending U.S. patent application Ser. No. 220,413, entitled "Machine Tool With Tool Changer" to Zankl et al.

Each of the tools (not shown) carried by the tool storage magazine 37 may be of a different size and a different type in accordance with the requirements of a particular machining program. Further, each of the tools carried by the magazine is used for at least one complete block of machine command instructions. In some cases, a particular tool may be used for several different successive blocks of command information or data.

It will be readily apparent that the tool spindle 46 is rotated at different preselected rates for each of the different tools carried thereby. Likewise, for advancing a tool carried by the tool spindle 46 into machining engagement with a workpiece carried by the worktable 14, the saddle 13, worktable 14, and spindle head 24 are selectively moved at different preselected feeding rates to accomplish a particular machining operation. Irrespective of the cooperatively preselected speed rate of the tool spindle 46 and feeding rate of the worktable 14, the present invention is disposed to effect a predetermined modification of the feed rate upon the occurrence of a momentary overload on the drive mechanism to the tool spindle 46. The proportionate reduction in the feed rate is preferably disposed to take place only for a particular block of command data. In other words, at the completion of the machining operation effected by one block of command data, the feed rate modifier for reducing the feeding rate is immediately deactuated, permitting the next block of command data to effect feeding movement at the preselected rate for the next program step in the machining program. It will be readily apparent that the present invention is particularly advantageous in a machine utilizing a plurality of different types of tools during a machining program, or in a machine predeterminately operative in response to a preset machining program.

As schematically illustrated in FIGURE 1, the various movements of the tool change machine tool are controlled by a numerical control system 58 that is operative to provide command instructions in response to a punched tape and associated tape reader 59 in a well-known manner. Further, as schematically illustrated in simplified block diagram form in FIGURE 1, there is shown a simplified functional distribution of the various commands necessary for effecting the major movements and other functions required for operating the tool changing machine tool. In response to operation of the tape reader 59, command instructions are transmitted along a conduit 61 to provide the required instructions to a tape input portion 62. The sequential command instructions provided by the tape input 62, are then transmitted along a conduit 64 to a function address register 65 which operates to distribute command data to the various controls. To accomplish this, each portion of data for a particular machine function is preceded by a letter address which initiates an appropriate switching function in the address register 65 for transmitting that data to the appropriate function control. For example, from the address register 65, a conduit 68 is connected to activate a miscellaneous function control 69 which is operative to control the initiation of the various miscellaneous control functions, such as the spindle stop and start, coolant on or off, spindle clockwise or counterclockwise, and tool change. For simplicity in FIGURE 1, the miscellaneous function control 69 is represented as being connected to transmit a control signal along a conduit 70 which is schematically illustrated as being directed to the tool change arm 48 and which is operative to control an associated tool change drive mechanism (not shown). Although the tool change drive mechanism is not shown in FIGURE 1, a simple sequencing switch command transmitted along the control conduit 70 is sufficient to initiate a tool change function as fully explained in the aforementioned co-pending patent application.

For controlling the rate of spindle rotation, the address register 65 is connected via a conduit 73 to selectively actuate a spindle rate control 74 schematically represented in FIGURE 1 as transmitting a rate control signal along a conduit 76 to the spindle head 24 which contains the rate changing transmission for driving the tool spindle 46. In a similar manner, the address register 65 is connected via a conduit 78 to selectively actuate a Y axis control 79 schematically represented as being connected along a conduit 81 to the circular support rods 30 and 31 for effecting vertical movement of the spindle head 24.

A conduit 82 is connected to transmit command instructions from the address register 65 to a Z axis illustrated in FIGURE 1 as transmitting control signals along a conduit 85 for effecting selective transverse positioning movement of the work support 14 along the Z axis.

From the address register 65, another conduit 87 is connected to actuate an X axis control 88 schematically illustrated in FIGURE 1 as being connected via a conduit 89 to effect horizontal longitudinal movement of the saddle 13 along the X axis.

As will hereinafter be more fully explained, each of the three directional axis controls 79, 83 and 88 is operative to control both the velocity and the extent of movement of the associated slide member.

Figure 2:
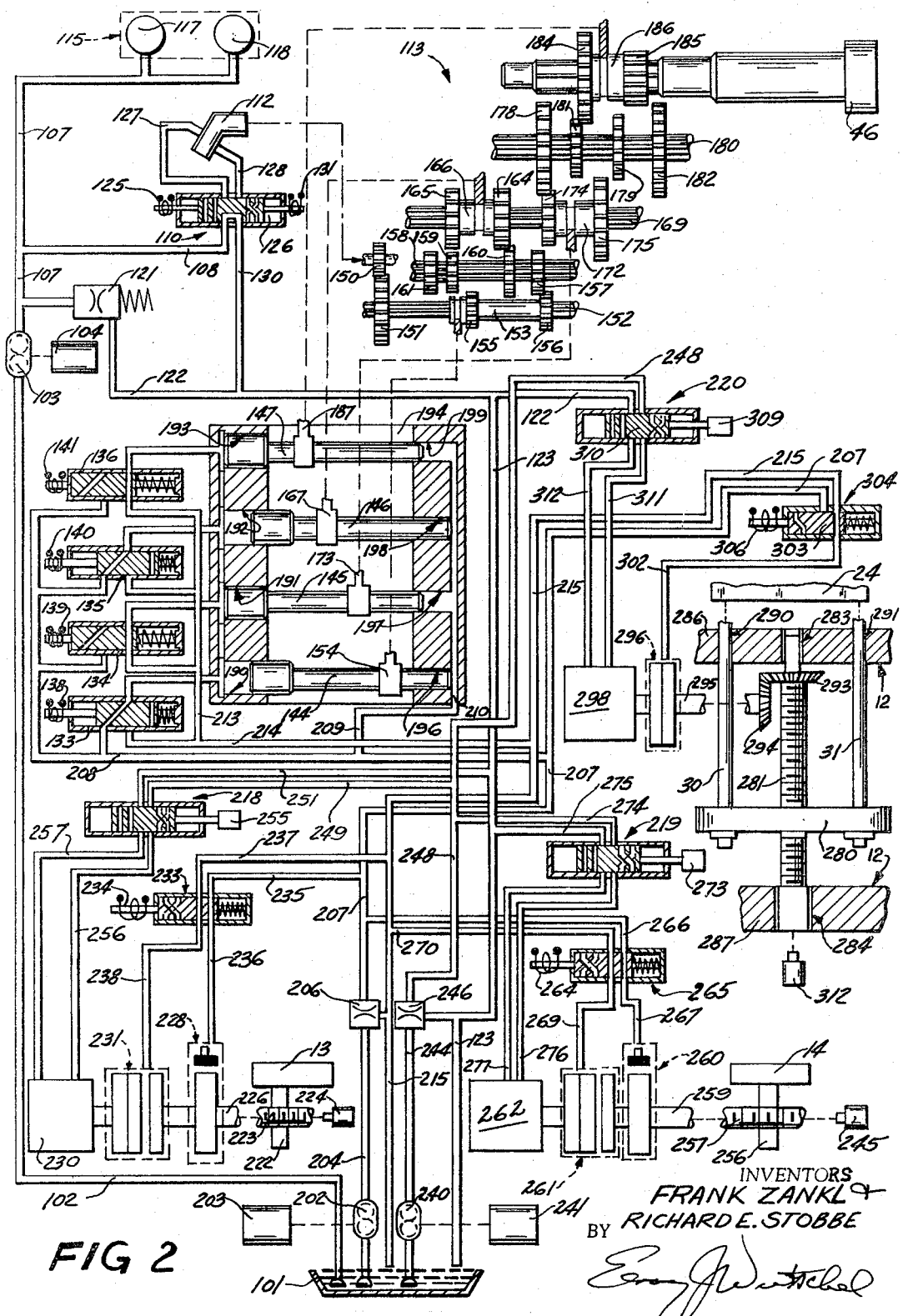
FIG. 2 is a schematic block diagram of the hydraulic control system for supplying power to drive the tool spindle, as well as the servo drive mechanisms for effecting selective relative movement between the tool spindle and the work support.

Power for rotating the tool spindle 46 and effecting rectilinear movement of the spindle head 24, the saddle 13, and worktable 14 is derived from a hydraulic system schematically illustrated in FIG. 2. As there shown, hydraulic fluid for driving the tool spindle 46 is withdrawn from a sump 101 and a hydraulic line 102 by a pressure pump 103 driven, in well-known manner, by a motor 104.

With the hydraulic pump 103 operating, pressure fluid is transmitted to a line 107 and a branch line 108, the latter being connected to supply fluid under pressure to a directional control valve 110 that is selectively operable to rotate a hydraulic motor 112 that is connected to provide input driving power to shiftably geared transmission mechanism 113 for rotating the tool spindle 46 at selected speed. In the event of an overloaded condition on the tool spindle 46, the hydraulic line 107 is directly connected to effect selective actuation of a two stage feed rate modifier controller 115, respectively comprising a pair of differently preset pressure actuated switches 117 and 118. For maintaining the proper pressure in the hydraulic supply line 107, this line is connected to a pressure regulating valve 121 having an overflow connected to a return exhaust line 122 connected via a line 123 leading directly to the sump 101.

For rotating the tool spindle 46 in a clockwise direction, a solenoid 125 is energized in well-known manner to effect rightward movement of a valve spool 126 in the valve 110. Thereupon, the pressure supply line 108 is connected via a port in the rightwardly moved valve spool 126 to a line 127 for rotating the hydraulic spindle drive motor 112 to effect clockwise spindle rotation. During this condition, exhaust fluid from the drive motor 112 is returned via a conduit 128 connected via a port in the rightwardly moved valve spool 126 to an exhaust line 130 connected directly to the return exhaust line 122.

To effect counterclockwise rotation of the tool spindle 46, the solenoid 125 is deenergized and the opposite solenoid 131 is energized to effect leftward movement of the valve spool 126. With the valve spool 126 moved leftwardly, a port thereon interconnects the pressure supply line 108 to the line 128 connected to effect rotation of the motor 112, this circuit being completed via the hydraulic line 127 and a valve port to the return exhaust line 130.

As illustrated in FIG. 2, shiftable adjustment of the transmission mechanism 113 is effected by selected coded energization of four associated solenoid control valves 133, 134, 135 and 136. Each of the valves 133 to 136 inclusive is respectively controlled by an associated solenoid 138 to 141 inclusive. Each of the valves 133 to 136 inclusive is connected to effect selected shiftable movement of associated shifter rods 144 to 147 inclusive, the latter being connected to effect shiftable movement of associated gear couplets operatively mounted in the shiftably geared transmission 113.

The input power for driving the transmission 113 is transmitted from the hydraulic motor 112 to a shaft carrying a gear 150 meshing with a gear 151 fixedly splined to a splined driven shaft 152 that carries a shiftable gear couplet 153 the position of which is controlled by a shifting fork 154 secured to the axially movable shifter rod 144. With the shifter rod 144 urged to its rightward position as illustrated in FIG. 2, a gear 156 of the couplet 153 engages a gear 157 fixedly splined to a shaft 158. Leftward shifting movement of the couplet 153 disengages gear 156 from gear 157, and effects shiftable movement of couplet gear 155 into engagement with a non-shiftable gear 159 carried by the splined shaft 158.

The splined shaft 158 is provided with a pair of spaced apart, non-shiftable gears 160 and 161 respectively adapted to be engaged by gears 164 and 165 comprising a unitary gear couplet 166. A shifting fork 167 secured to the axially movable shifter rod 146 is adapted to engage a groove formed in the hub of the couplet 166 which is slidably splined to the spline shaft 169. With the shifter rod 146 urged to its rightward position, as shown in FIG. 2, the couplet is shifted into a position for retaining the gear 164 in engagement with the fixed gear 160. It will be apparent that shiftable movement of the shifter rod 146 to leftward position will effect corresponding leftward movement of the couplet 166 to disengage the gear 164 and move the gear 165 into engagement with the fixed gear 161.

The splined shaft 169 is provided with another axially shiftable gear couplet 172 provided with a groove engaged by a shifting fork 173 that is attached at its lower end to the axially movable shifter rod 145. The couplet 172 is provided with gears 174 and 175 respectively engageable with non-shiftable gears 178 and 179 fixedly secured to the splined shaft 180.

In addition, the splined shaft 180 is provided with non-shiftable fixed gears 181 and 182 selectively engaged by cooperatively meshing gears 184 or 185 respectively, and that comprise the couplet 186. The hub of gear couplet 186 is provided with a peripheral groove engaged by one end of a shifter fork 187 fixedly secured at its lower end to the axially movable shifter rod 147.

As shown in FIG. 2, the shifter rod support member 194 is provided with a leftward wall having integrally formed therein four enlarged cylindrical openings 190, 191, 192 and 193 which are respectively disposed to receive the enlarged leftward ends of the shifter forks 144, 145, 146 and 147. In a similar manner, the shifter rod support member 194 is provided with a rightward wall having four smaller diameter cylindrical openings 196, 197, 198 and 199. The small diameter openings are respectively disposed to receive the corresponding small diameter rightward ends of the shifter rods 144, 145, 146 and 147. It will be readily apparent that a different piston effect is achieved between the small diameter cylindrical openings and the large diameter cylindrical openings. To normally maintain the four shifter rods in their leftwardly urged positions, there is provided a low pressure hydraulic supply system including a pump 202 driven by a motor 203 for withdrawing hydraulic fluid from the sump 101 and directing it to a pressure supply line 204. From the line 204, hydraulic fluid under pressure is transmitted through a pressure regulating valve 206 to a main low pressure hydraulic supply line 207. From the main pressure line 207, a branch line 208 is connected via a plurality of individual branches to supply pressure under fluid to the solenoid actuated valves 133, 134, 135 and 136. Pressure fluid from the same branch line 208 is likewise transmitted through a branch line 209 to transmit fluid under pressure to a line 210 which is directly connected to supply pressure fluid to the four small diameter cylindrical openings 196, 197, 198 and 199 for the purpose of normally urging the associated shifter rods to their extreme leftward positions. To effect shifting movement of a selected shifter rod, it is necessary to energize the solenoid of the associated solenoid valve thereby admitting pressure fluid to one of the large cylindrical openings, this condition being illustrated for shifter rods 144 and 146, respectively, in FIG. 2. Energization of solenoid 138 effects rightward movement of the associated valve spool to interconnect the branch pressure supply line via a port in the rightwardly moved spool of valve 133 to a pressure line connected directly to the enlarged cylindrical opening 190. With pressure supplied to the enlarged cylindrical opening 190, the shifter rod 144 is moved to its extreme rightward position. In like manner, the solenoid 140 is represented as being energized to effect rightward movement of the valve spool, thereby interconnecting the branch pressure supply line 208 via a port in the rightwardly moved valve spool to a branch line connected directly to the enlarged cylindrical opening 192. Pressure within the opening 192 urges the enlarged end of shifter rod 146 rightwardly in opposition to the identical pressure supplied via line 210 to the smaller opening 198.

Solenoids 139 and 141 are represented in FIG. 2 as being deenergized, permitting the pressure from the supply line 210 to urge both of the shifter rods 145 and 147 in a leftward direction. With this condition existing, a common supply line extends from the enlarged cylindrical opening 191, via a port in the leftwardly moved valve spool of valve 134 and thence to an exhaust line 213 connected via a line 214 to the main exhaust line 215 extending to the sump 101.

With the spindle control valve 110 energized to effect rotation of the tool spindle 46 in selected direction, it will be readily apparent that the solenoids 138, 139, 140 and 141 are energizeable in code fashion to effect the required shiftable movement of the associated shifter rods and the required shifting movement of the associated shiftable gear couplets in the transmission 113 for rotating the spindle 46 at selected rate. It will be understood that coded, selective energization of the four valve solenoids 138, 139, 140 and 141 are effected by preselected actuation of the spindle rate control 74 illustrated in FIGS. 1 and 3. Thus, as a prerequisite to performing a required machining operation, the tool spindle 46 is connected to rotate at a selected rate in a selected direction for the particular operation being performed.

For effecting selected feeding movement of the saddle 13, worktable 14, and spindle head 24, as shown in FIG. 2, there are provided three associated servo control valves 218, 219, and 220 respectively. As a prerequisite to activating one or another of the servo control valves 218, 219 or 220 for effecting slide movement along the X, Z or Y axes of movement it is necessary to effect engagement of a clutch associated with each of the slide members.

As schematically illustrated in FIG. 2, the saddle 13 is provided with a depending nut 222 that threadedly engages a rotatable screw 223 connected at one end to drive an associated position indicating resolver 224. An associated drive shaft 226 for rotating the saddle traverse screw 223 is normally constrained against rotation by a dynamically engaged brake 228 and is disconnected from an associated servo drive motor 230 by means of a selectively engageable clutch 231. Engagement of the brake 228 and disengagement of the clutch 231, as schematically represented in FIG. 2, is accomplished by an associated valve 233, the solenoid 234 of which is deenergized. With this condition existing, the main pressure supply line 207 is connected via a branch line 235 and a port in the leftwardly biased spool of the valve 233 to a line 236 connected to effect engagement of the brake 228. At the same time, the main exhaust line 215 is connected via a branch exhaust line 237, via a port in the leftwardly biased valve spool to a line 238 now connected to exhaust fluid from the clutch 231.

Concomitantly with activation of the servo valve 218 to effect operation of the servo motor 230, solenoid 234 is energized to effect rightward movement of the control spool of valve 233. Upon energization of the solenoid 234, the brake 228 is immediately disengaged since the line 236 is now connected via a port in the rightwardly urged spool of valve 233 to the exhaust line 237. Likewise, the pressure supply line 235 is connected through a port in the rightwardly urged valve spool to the line 238 for effecting engagement of the X axis drive clutch 231. With these conditions having been established, the servo motor 230 is immediately connected via the now engaged clutch 231 to the drive shaft 226 connected to effect rotation of the traverse screw 223 and the positioning servo 224, thereby effecting corresponding longitudinal movement of the cooperating nut 222 and saddle 13 along the X axis. For operating the servo motor 230 to effect movement along the X axis, the servo valve 218 is connected to receive pressure fluid from a high pressure hydraulic system. The high pressure system is provided with a pump 240 driven in well-known manner by a motor 241, thereby withdrawing fluid from the sump 101 and transmitting it to a supply line 244. From the supply line 244, the high pressure fluid continues through a pressure regulating valve 246 to a main supply line 248. From the high pressure supply line 248, fluid is transmitted via a branch line 249 to an inlet port of the servo control valve 218. The servo valve 218 is likewise provided with an exhaust or return port connected via a branch line 251 connected to a return exhaust line 123 that operates to return fluid to the sump 101. The return line 123 is likewise connected to return fluid from the high pressure regulating valve 246. For dynamically actuating the servo motor 230, a servo winding 255 is selectively energizeable to effect movement of a servo valve spool in the appropriate direction for effecting the required directional rotation of the servo motor. Upon energization of the servo winding 255 for moving the associated valve spool rightwardly, pressure fluid from the branch supply line 249 is transmitted through the port in the rightwardly moved valve spool to a line 256 connected to rotate the servo motor 230 for moving the saddle 13 in a rightward direction along the X axis. At the same time, the return flow of fluid from the servo motor 230 is transmitted along a return line 257 via a metering port in the rightwardly displaced valve spool to the branch exhaust line 251. Conversely, energization of the servo winding 255 to effect leftward movement of the associated valve spool operates to connect the pressure supply line 249 to the supply line 257 for rotating the servo motor 230 to effect leftward movement of the saddle 13. With this condition existing, return flow of fluid from the servo motor 230 is transmitted along the line 256 via the port in the leftwardly moved valve spool to the exhaust line 251. As is known in the art, the servo valve 218 is operative to control both the direction and rate of movement effected by the servo motor 230, as well as to dynamically maintain the servo motor 230 in its selected position.

For effecting transverse movement of the table 14 along the Z axis, a depending table screw nut 256 threadedly engages a traverse screw 257 journaled to rotate in the saddle 13. Rotation of the traverse screw 257 effects movement of the depending nut 256 and worktable 14 along the Z axis in selected direction, and at the same time, operates to effect rotational movement of the positioning resolver 245.

For rotating the cross traverse screw 257, there is provided a drive shaft 259 that is normally constrained against rotation by means of a dynamically engaged brake 260, schematically illustrated in FIG. 2. Whenever the brake 260 is engaged, an associated clutch 261 is disengaged in a manner to disconnect the servo drive motor 262 from the shaft 259 during the period it is mechanically braked against rotation. To maintain the condition illustrated in FIG. 2, a solenoid 264 of a valve 265 is deenergized, permitting resiliently biased leftward movement of the associated valve spool. Consequently, fluid from the low pressure hydraulic system is transmitted from supply line 207 via a branch line 266 and then through a port in the leftwardly moved valve spool to a line 267 connected to effect pressure actuated engagement of the brake 260. At the same time, the clutch 261 is disengaged due to the fact that a line 269 is connected via a port in the leftwardly moved valve spool to a branch line 270 connected to the main exhaust line 215.

Energization of the solenoid 264 effects rightward movement of the valve spool in opposition to the spring, thereby effecting disengagement of the brake 260 and engagement of the clutch 261. With the valve spool moved to its rightward position, the pressure supply line 266 is connected to the line 269 effecting engagement of the clutch 261, and the line 267 is connected to the return exhaust line 270 permitting disengagement of the brake 260. Whenever the clutch 261 is engaged as described, the servo motor 262 is selectively energizeable to rotate the drive shaft 259 for effecting the selected transverse movement of the worktable 14 along the Z axis. Servo motor 262 is actuated upon selective energization of a servo winding 273 to effect the required movement of an associated valve spool of the servo valve 219, thereby connecting pressure supply line 274 and exhaust line 275 to supply lines 276 and 277 for the servo motor 262. Energization of the servo winding 273 to effect rightward movement of the associated valve spool operates to connect the branch pressure supply line 274 directly to the line 276 for rotating a servo motor 262 for effecting inward, transverse movement of the worktable 14. With this condition existing, the return fluid from motor 262 is exhausted via line 277 and hence through the port of the rightwardly moved valve spool to the exhaust line 275.

Conversely, energization of the winding 273 to effect leftward movement of the spool effects a connection of the pressure supply line 274 to the line 277 for actuating the servo motor 262 for effecting outward, transverse movement of the worktable 14. For effecting movement of the worktable 14 in either direction along the Z axis, it will be apparent that the valve solenoid 264 is energized as a prerequisite to effecting energization of the servo control winding 273 of the servo valve 219.

As hereinbefore explained, vertical movement of the spindle carrying head 24 is effected by the vertically movable circular rods 30 and 31 secured thereto. As shown in FIG. 2, the circular rods 30 and 31 are fixedly secured at their lower ends to a traveling nut member 280 that is threadedly engaged by a rotatable screw member 281. The screw 281 is journaled to rotate at its upper and lower ends in bearings 283 and 284 respectively supported in vertically spaced apart, non-movable walls 286 and 287 formed in the base or bed 12 (FIG. 1). The circular elevating rods 30 and 31 extend through bored openings 290 and 291 formed in the upper bed section 286. Thus, rotational movement of the screw 281 in its stationary supporting bearings 283 and 284 effects vertical movement of the traveling nut 280, and the rods 30, 31 secured thereto for effecting corresponding vertical movement of the spindle head 24.

For rotating the screw 281, a bevel gear 293 secured thereto is engaged by a complementary bevel gear 294 driven by a rotatable shaft 295 connected via a rollover or "no-back" clutch 296 to a selectively energizable servo drive motor 298. Whenever the clutch 296 is disengaged for disconnecting the servo motor 298 from the drive shaft 295, the "no-back" clutch functions as a brake to preclude rotational movement of the shaft 295 for preventing downward vertical movement of the spindle head 24. The "no-back" clutch 296 is disengaged whenever a hydraulic supply line 302 is connected to exhaust via a port in a leftwardly biased valve spool 303 of a valve 304, which is positioned to continue the exhaust circuit to the main exhaust line 215. Energization of a solenoid 306 effects rightward movement of the valve spool 303 in opposition to the spring, thereby connecting the main, low pressure supply line 207 directly to the line 302 for effecting engagement of the "no-back" clutch 296, which is then bidirectionally operative to transmit driving power for moving the spindle head 24 in selected vertical direction along the Y axis. To accomplish this, a winding 309 is selectively energized to effect appropriate movement of a valve spool 310 of the servo valve 220 for energizing the servo motor 298. Energization of the winding 309 actuates the servo valve 220 for effecting a connection of the high pressure hydraulic supply line 248 and main exhaust line 122 to a pair of supply lines 311 and 312 extending to the servo drive motor 298. Energization of the winding 309 to move the valve spool 310 in a rightward direction effects a direct connection of the pressure supply line 248 via a port in the rightwardly moved valve spool 310 to the line 311 for operating the servo motor 298 to effect upward movement of the spindle head 24. With this condition existing, exhaust fluid from the servo motor 298 is transmitted via a return line 312 and a port in the valve spool 310 to the return exhaust line 122.

Conversely, energization of the winding 309 to effect leftward movement of the valve spool 310 effects an operative connection of the hydraulic supply line 248 to the line 312 for operating the servo motor 298 to effect downward vertical movement of the spindle head 24. During downward movement of the spindle head 24, exhaust fluid from the servo motor 298 is transmitted through the line 311 and a port in the now leftwardly moved valve spool 310 to the main exhaust line 122. For effecting accurate vertical positioning movement of the spindle head 24, a resolver 312 is connected to be rotated, as schematically illustrated in FIG. 2. Although the resolvers 224, 245, and 312 have been schematically illustrated in FIG. 2 for indicating the extent of movement along the X, Y and Z axes respectively, it will be readily apparent that other forms of position indicating transducers can be used with equal facility.

Figure 3:
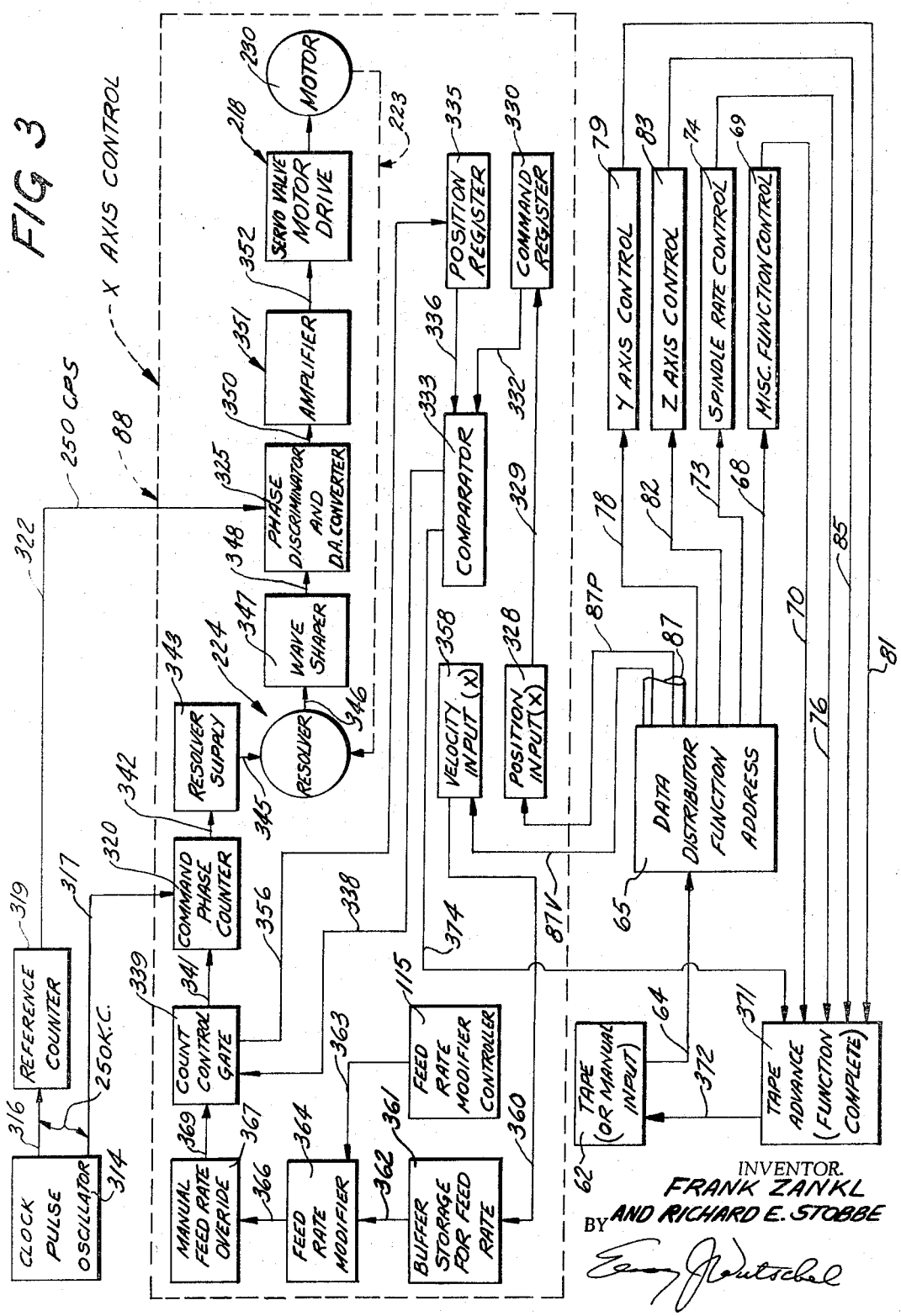
FIG. 3 is a block diagram of the numerical control system for effecting programmed operation of the various movable members of the machine illustrated in FIGURE 1 and including the feed rate modifier.

In FIG. 3, there is represented a block diagram that illustrates generally the method of transmitting the tape command data to the various function controls, and the method of providing a pulsing type signal for effecting velocity controlled positioning movement of the three major movable members along the X, Y, and Z axes. The positioning control system is of the pulse counting type and is illustrative of several similar commercially available tape control systems. Although the present invention is represented as being incorporated in a pulse counting numerical control system, as illustrated in FIG. 3, the invention can be used with equal advantage in positioning systems of the phase analogue type, and in combination with other simplified types of motor driven control systems.

As illustrated in FIG. 3, a clock pulse oscillator is adapted to provide an output reference signal comprising a continuous train of pulses at a rate of 250 kc. This signal from the clock pulse oscillator 314 is transmitted via conductors 316 and 317 to a reference counter 319 and a command phase counter 320, respectively. The reference counter 319 may be a three decade counter providing 1000 clock pulses to provide one count at the output of the reference counter along a line 322. The output along conductor 322 is a symmetrical square wave between 0 volt and 6 volts, that is fed to a phase discriminator and digital to analog converter 325. It will be noted that the command phase counter 320 and the phase discriminator 325 are represented as being within a dashed line enclosure 88, which is a schematic representation of the X axis control. Although not represented in the drawings, it is noted that the clock phase oscillator 314 and reference counter 319 are connected via other conductors (not shown) extending to analogous portions of the Y axis control 79 and the Z axis control 83. Inasmuch as the X axis control 88 is substantially identical to the Y axis control 79 and the Z axis control 83, it is not deemed necessary to repeat the detailed, count pulsing diagram for the latter two controls.

As hereinbefore explained with reference to FIG. 1, sequentially presented command data from the tape input 62 is transmitted along circuit 64 to a function address register 65 for distribution to the X axis control 88, the Y axis control 79, the Z axis control 83, spindle rate control 74 and the miscellaneous function control 69. Command information for effecting X axis movement is transmitted from the function address register via an output conduit 87, including conductors 87V and conductor 87P. For controlling the extent of X axis positioning movement, the conductor 87P is connected to activate an X position input register 328 connected along a conduit 329 to transmit the required position command data to a command register 330. The command register 330 is, in turn, connected via conductor 332 to a comparator 333 which is likewise connected to receive input information from a position indicating register 335 via conductor 336. In the event the command register 330 has received data requiring X axis movement to a different position, the comparator 333 is then operative to transmit a control signal along a conductor 338 to a count control gate 339, the latter being operative to control the number of command pulses for effecting required X axis movement to the desired position.

Whenever there is a difference between the position register 335 and the command register 330, a signal from the comparator 333 is transmitted along conductor 338 to actuate the count control gate 339 for effecting an output signal along a conductor 341 for actuating the command phase counter 320 to provide a number of output pulses for controlling the extent of X axis movement. Command pulses from the counter 320 are then transmitted via conductor 342 to a resolver supply 343 and thence via conduit 345 to the resolver 224. From the resolver 224 either a leading or lagging signal is transmitted via a conductor 346 to a wave shaper 347 which is connected via a conductor 348 to provide a corresponding leading or lagging signal to the phase discriminator 325. The pulse control signal is transmitted from the phase discriminator 325 via conductor 350 to an amplifier 351 connected via conductor 352 to actuate the servo valve 218 for effecting the required directional control of the motor 230.

The servo control valve 218 will operate in response to the signal received from the amplifier 351 to effect the required directional rotation of the motor 230 for moving the saddle 13 in the proper direction along the X axis. At the same time, the motor 230 is coupled via the mechanical actuator 223 to effect positioning movement of the resolver 224 as the motor is operated to effect X axis movement. As the saddle is moved along the X axis in response to actuation of the motor 230, control pulses are transmitted from the count control gate via a conductor 356 to actuate the position register 335, thereby decreasing the actual difference between the position register and the desired position supplied to the command register from the control tape.

As the X axis position input control 328 is dynamically controlling the extent of X axis movement, the velocity input control 358 is operative to control the velocity of X axis movement. From the velocity input control 358, a control signal is transmitted along conductor 360 to a buffer storage register 361 for the X axis feed rate. At the start of any X axis feed movement for performing a machining operation, it will be apparent that there will be no signal from the feed rate modifier controller 115, shown in FIGS. 2 and 3. With this condition existing, therefore, no signal will be transmitted from the feed rate modifier controller 115, FIG. 3, along a conductor 363 to the actual feed rate modifier 364. Therefore, the feed rate signal transmitted to the buffer storage 361 will be transmitted via conductor 362, and via the feed rate modifier 364 with no change in rate, to a conductor 366 connected to a manual feed rate override controller 367. As will hereinafter be more fully explained, the manual feed rate override controller 367 is selectively adjustable to provide a predetermined reduced rate of control movement to the count control gate 339. Normally, however, the manual feed rate override controller 367 is preset for 100% operation, i.e., it functions to transmit the exact feed rate control signal from the conductor 366, to an output conductor 369 that is connected to provide a feed rate input signal to the count control gate 339. The velocity signal along conductor 369 operates the count control gate to control the frequency of the directional command pulses for controlling the feed rate velocity along the X axis of movement. Thus, the count control gate is operating in response to two separate cooperating input signals. The number of pulses for controlling the total extent of positioning movement along the X axis is provided by the input conductor 338, and the frequency of the pulses is determined by the velocity control signal along the conductor 369.

In the usual automatic mode of tape controlled operation, and in the absence of any momentary spindle overload effecting actuation of the feed rate modifier controller 115, the frequency of position command pulses from the command phase counter 320 will operate as determined by the tape controlled feed rate, and as transmitted from the velocity input control 358 illustrated in FIG. 3.

During machine operation, the rate of X axis movement can be varied by manual operation of the manual feed rate override 367. Further, in the event of a momentary predetermined load on the spindle drive train, the feed rate modifier controller 115 is actuated to transmit a signal along conductor 363 for actuating the feed rate modifier 364 to effect a predetermined reduction in the feed rate signal transmitted from the buffer storage register 361. The feed rate reduction is approximately 80° of the commanded feed rate, irrespective of the commanded feed rate during any machining operation. Actually, the feed rate modifier controller 115 is a two stage device, the first stage of which provides an automatic 80° reduction in the commanded feed rate for the balance of a particular cycle of machine operation in response to the immediate preceding block of tape information. Any prolonged or excessive load on the spindle drive train will provide an additional signal from the feed rate modifier controller 115 which is then operative to transmit a signal along conductor 363 to so operate the feed rate modifier 364 as to completely stop the existing feed movement along the X axis. A readjustment of the X axis feeding movement may then be effected by manual operation of the manual feed rate override 367 to so reduce the X axis feeding rate that the particular cycle of machine operation may be resumed and completed.

As hereinbefore explained with reference to FIG. 2, the manual feed rate override controller 115 comprises the two pressure switches 117 and 118 respectively interconnected in the pressure supply line 107 that is connectable to drive the spindle motor 112 for effecting rotation of the tool spindle 46 at the predetermined tape controlled rate. During a machining operation involving X axis movement, the tool spindle 46 is operated at predetermined rate for rotating a tool carried thereby into cutting engagement with a workpiece supported on the table 14 and moved into machining engagement by operation of the X axis servo drive motor 230 as hereinbefore explained.

Upon completion of the required machine movements in response to one block of command data from the control tape, function complete signals are transmitted to activate a tape advance or function complete controller 371 shown in FIG. 3. Upon actuation of the function complete controller 371, a signal is transmitted therefrom along conductor 372 to effect sequential advancement of the tape for recording the various portions of command data which are transmitted along conductor 64 to the function address distributor 65, as hereinbefore explained. It is emphasized that all prior command instructions must be completed before the function complete controller 371 operates to advance the tape. For example, upon completion of X axis movement, coincidence will exist between the X axis command register 330 and the position indicating register 335. With this condition existing, coincidence signals are transmitted from these two registers via conductors 332 and 336 to the comparator 333 which then functions to tranmit a null signal along conductor 338 to the count control gate 339, thereby stopping the X axis movement in the required position. At the same time, the comparator 333 is operative to transmit a function complete signal along another output conductor 374 which is connected to provide a signal to a function complete controller 371. In a similar manner, function complete signals are transmitted from the Y and Z axis control 79 and 83 via conductors 81 and 85 connected to the function complete controller 371. The spindle rate control 74 is provided with a coded control circuit operative to effect the commanded energization of shift control valve solenoids 138, 139, 140 and 141 shown in FIG. 2. Upon completion of the required shifting movement of the gears in the transmission 113, an interlocking shift complete switching mechanism (not shown) is operative in well-known manner to indicate that the selected shifting movement has been completed, and returns a shift complete signal to the spindle rate control 74, FIG. 3. The shift complete controller is operative both to effect selective energization of one or another of the spindle drive motor solenoids 125 or 131, FIG. 2, and to provide the necessary function complete signal from the spindle rate control 74 in FIG. 3 along conductor 76 to the function complete controller 371.

In response to appropriate coded input information, the miscellaneous function control 69 is operative to effect initiation of various functions including tool changing by means of a plurality of different sequencing circuits (not shown). Upon the initiated functions being completed, a function complete signal is transmitted from the miscellaneous function control 69 via conductor 70 to provide the necessary signal to the function complete control 371.

Inasmuch as the tape input 62 is digitally operative to provide the various command signals upon actuation of the function complete controller 371, machine functions are not performed during the interval that the function address register 65 is connected to transmit the various command data into the various operatively associated storage registers. This insures complete storage of all command data before the selected controls are activated to initiate the machine functions commanded in the immediate preceding block of tape information. The arrangement is such that after a programmed block of command data is fully stored in the various control registers, an end of block signal presented by the control tape activates the tape reader to immediately stop operation of the tape reader, and at the same time initiate the various functions required by the immediate prior block of tape data. In addition to activating the various selected controls to initiate the required machine movements, the end of block signal is also connected to deactuate the feed rate modifier controller 115, represented in FIG. 3. Thus, in the event the feed rate modifier controller 115 had been activated during the previous block of machine movements, the feed rate modifier 364 would then have been connected to effect a proportionate reduction in the frequency of pulses commanded by the count control gate 339, as hereinbefore explained. The reduced rate of feed movement would then be continued only for the balance of those machine movements commanded by the immediate, prior block of command input information.

Deactuation of the feed rate modifier controller 115 in response to an end of block signal likewise deactuates the feed rate modifier 364 in a manner to permit the count control gate 339 to control X axis feeding movement at whatever rate is required by the tape.

Figure 4:
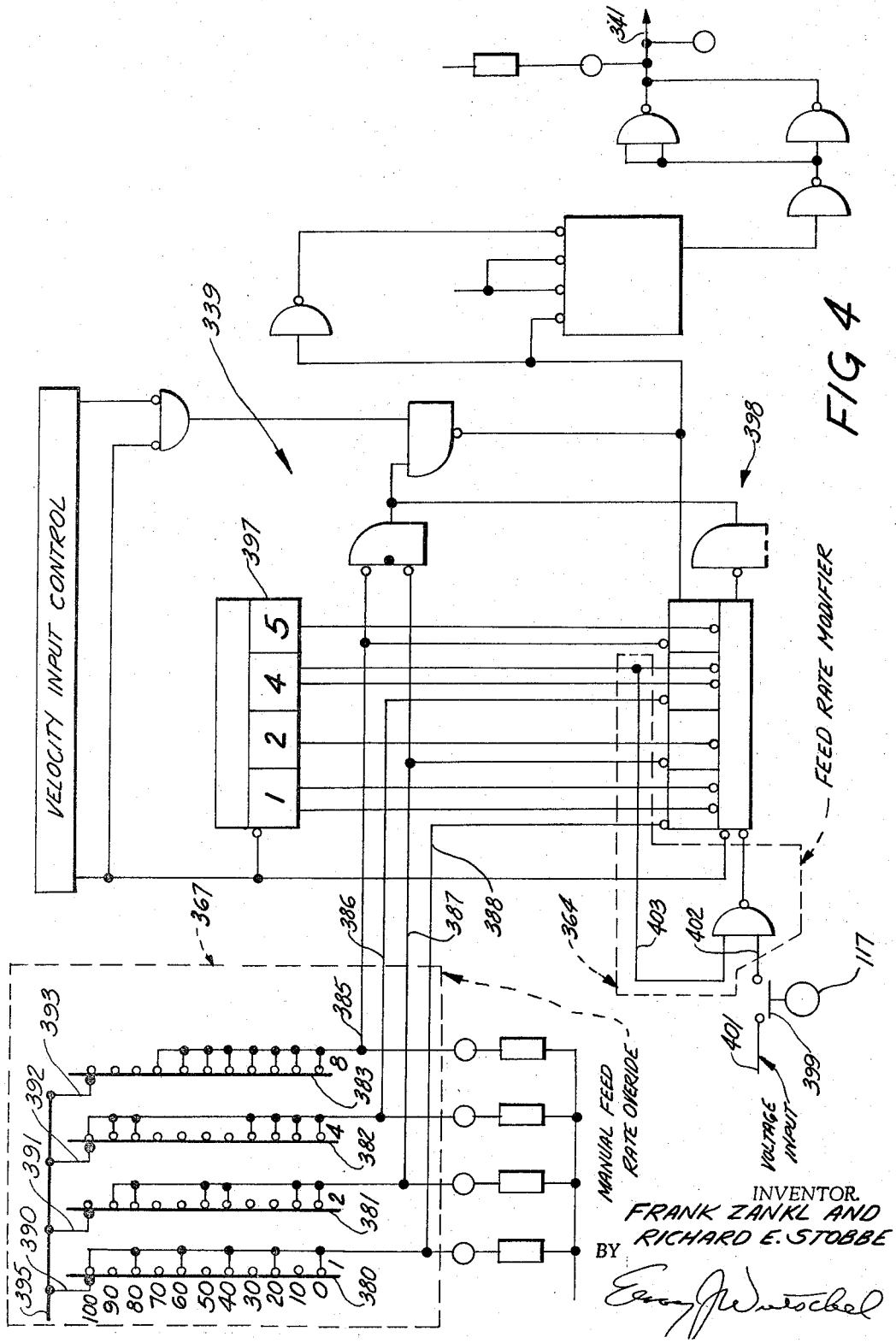
FIG. 4 is an enlarged, fragmentary detailed view of a portion of the control circuit for effecting rate control of the feed movements, as well as the feed rate modifier control for effecting a predetermined adjustment in the rate of feeding movement of the worktable.

In FIG. 4, there is represented in fragmentary diagrammatic form a portion of the velocity control in combination with the selective, manual velocity modification effected by the manual feed rate override control 367, and the automatic feed rate modifier 364. As schematically shown in FIG. 4, the manual feed rate override control 367 comprises four vertically disposed banks of switch contacts 380, 381, 382 and 383. Each of the vertical banks of switch contacts 380 to 383, inclusive, comprise eleven (11) different contact terminals, certain of which are represented as being connected via associated conductors to the conductors 385, 386, 387 and 388 respectively. Each of the vertical banks of contacts 380 to 383 inclusive are respectively adapted to be engaged by associated contacts respectively carried by simultaneously indexable switch arms 390, 391, 392 and 393. As represented in FIG. 4, the indexable switch arms 390 to 393, inclusive, are all adjusted in a manner that the switch contacts carried thereby engage the uppermost, or eleventh contact in each of the vertical banks 381 to 383, inclusive. As indicated in the column to the left of the vertical switch bank 380, the uppermost contact in each of the four vertical switch banks provides 100% feed velocity level. In other words, adjustment of the switch arms 390 to 393, inclusive, must be made at the 100% level in order to insure an output velocity signal from the conductor 341 at the tape commanded input rate. As the switch arms 390 to 393 are indexably adjusted downwardly, the associated contacts may be preset at the 90% to the 0% level If these contacts are preset at the 90% level, then, the arrangement is such that the velocity control signal from the conductor 341 is 90% of the tape commanded rate.

The switch arms 390 to 393 inclusive are respectively adapted to complete circuits from a common input conductor 395 to the four associated contacts, thence via one or another of the interconnecting conductors 385, 386, 387 and 388 to modify the tape commanded input velocity of the count control gate 339. As represented in FIG. 4, one of the decade counters 397 for properly controlling pulse counting rates from the velocity input control of the count control gate 339 is interconnected via the feed rate override control conductors 385, 386, 387 and 388 to an intermediate switching network 398 connected to supply an appropriate signal to the pulse counting velocity control conductor 341.

It will now be assumed that the machine is operating to perform a selected machining operation, that the feed rate override control 367 is preset at the 100% level as shown, and the velocity signal via the output conductor 341 provides a feed rate at the tape commanded level. It will further be assumed that the load on the spindle drive motor 112, FIG. 2, exceeds a predetermined level due to the occurrence of an overload on the tool spindle 46, thereby effecting actuation of the pressure switch 117 of the feed rate modifier controller 115. Actuation of the pressure switch 117 effects closure of an associated contact bar 399, FIG. 4, completing a circuit from an input control conductor 401 to a conductor 402 interconnected with a conductor 403, thereby effecting actuation of the feed rate modifier 364 for reducing the preselected tape controlled feed rate a predetermined amount for continuing the machining operation then being effected by rotation of the tool spindle 46, FIG. 2. Preferably, the resulting velocity of the feed rate is reduced to approximately 80% of its tape commanded rate. Even though the resulting load on the tool spindle 46 is then reduced as the feed rate of the work support is reduced, the feed rate modifier 364 continues to modify the output velocity rate along conductor 341 until that particular machining operation is completed, and is not reset until the next end of block signal is operated on the control tape. For maintaining the feed rate modifier 364 in actuated condition during completion of the existing block of machine movements, pressure actuated switch 117 may be of the latching type that is unlatched by an "end-of-block" signal obtained from the tape 409, or a static switching arrangement (not shown) may be used in lieu of the switch 117 and associated contact bar 399.

In FIG. 5, there is illustrated a diagrammatic view of a tape reader 59 and control tape 409 for effecting a programmed operation of the machine illustrated in FIGURE 1. As known in the art, a sprocket 406 indexably driven by a timing belt 407 from a power source 408 effects indexable advancement of a control tape 409, a fragment of which is illustrated in FIG. 5. At the same time, the timing belt 407 is connected to effect cam actuated retraction of a plurality of tape reading switch plungers 411, each time the tape 409 is advanced. In FIG. 6, there is shown the tape fragment 409, which is of the well-known eight channel type, engaging the cooperating switch plungers which function in well-known manner to read the coded input data from the tape 409.

In FIG. 7, there is illustrated a fragment of the control tape 409 illustrating the letter address for the X axis, together with command position instructions for X axis movement. In addition, a feed rate command address comprising punched holes in the second, third, fifth, sixth and seventh channels is illustrated, along with the coded instructions for effecting a seven inch (7″) feed rate during X axis movement which is initiated upon advancement of the punched hole in channel 8 into switch reading position to provide the end of block signal for initiating X axis movement according to the prior commanded input data. As hereinbefore explained, the end of block signal comprising the punched hole in channel 8, for illustrative purposes in this application, is operative also to deactuate the feed rate modifier 364 illustrated in FIGS. 3 and 4. After the end of block signal, the two separate pressure switches 117 and 118 comprising the feed rate modifier controller 115, in FIGS. 2 and 3, is prepared for reactuation upon the occurrence of another momentary or sustained overload. The pressure switch 118 may be connected to effect total deactuation of whichever servo control valve is effecting feeding movement, or may be connected to effect a zero rate modification of the count control gate 339 represented in fragmentary diagrammatic form in FIG. 4.

Although not illustrated in FIG. 7, it will be apparent that other control signals for effecting additional X, Y or Z movements may be programmed to occur during any preselected portion of a machine program. Likewise, spindle rate control or one or another of the miscellaneous control functions may be programmed to occur during that portion of the tape indicated at block 2 in FIG. 7.

Although the illustrative embodiments of the invention have been described in considerable detail for the purpose of fully disclosing a practical operative structure and feed rate modifier control system by means of which the invention may be practiced, it is to be understood that the particular control system and apparatus herein described are intended to be illustrative only and that the various novel characteristics of the invention may be incorporated in other structural forms and types of control systems without departing from the spirit and scope of the invention, as defined in the subjoined claims.

The principles of this invention having now been fully explained in connection with the foregoing description, we whereby claim as our invention:

1. In a machine tool having a rotatable tool spindle and a relatively movable work support;
   a variable speed hydraulic drive system operative to rotate said spindle at a preselected rate;
   a variable speed feed drive mechanism operative to move said work support at a preselected feed rate for moving a workpiece carried by said work support into cutting engagement with a cutter carried by said tool spindle;
   a pressure switch interconnected in said hydraulic drive system for said spindle said switch being open during a normal machining operation, but being preset for actuation upon the occurrence of an abnormal load on said spindle drive system, and
   a feed rate controller separate from said drive systems and operative to reduce the preselected feed rate of said variable feed drive mechanism upon being connected by said pressure switch for reducing the load on said spindle by effecting relative feeding movement of said work support at a predetermined reduced rate.

2. In a machine tool having a rotatable tool spindle and a cooperative relatively movable work support;
   separate variable speed transmissions respectively presettable to rotate said spindle and effect relative movement of said work support to effect a machining operation on a workpiece carried thereby;
   a program control system including a control tape operative to selectively preset both of said transmissions for rotating said spindle and moving said work support to perform a machining operation at the rates selected;
   a feed reducing apparatus selectively operative when actuated to reduce the feed rate of movement of said work support a predetermined amount irrespective of the preset adjustment of said associated variable speed transmission in response to said program control system;
   a controller operative on the occurrence of a predetermined degree of load on said spindle during a machining operation to actuate said speed reducing apparatus for reducing the rate of movement of said work support; and, means responsive to a control tape signal from said program control system for deactivating said speed reducing apparatus in a manner that said variable speed transmission for said work support is operative to provide whatever full output is preset by said program control system.

3. In a machine tool;
a work support adapted to move a workpiece at a selected feed rate;
a rotatable spindle adapted to carry a cutting tool for engaging a workpiece carried by said relatively movable work support for performing a selected machining operation;
a hydraulic drive system presettable to drive said spindle at a selected rate;
a separate presettable feed drive transmission operative to move said work support at a predetermined feed rate for moving a workpiece carried thereby into machining engagement with a cutting tool carried by said tool spindle to perform a selected machining operation;
feed reducing control means operatively actuatable upon the occurrence of a predetermined degree of load on said spindle motor during a machining operation to reduce the feed rate effected by said feed drive transmission;
and switch control means operative to deactuate said feed reducing control means in a manner that said feed drive transmission is operable to drive said work support at a selected preset rate.

4. In a machine tool having a rotatable tool carrying spindle and a cooperatively movable work support adapted to support a workpiece for movement to effect a machining operation;
a first power drive operative to rotate said tool spindle at a selected speed rate;
a second variable speed power drive operative to effect relative feed movement of said work support for selectively moving a workpiece carried thereby into machining engagement with a cutting tool carried by said rotating tool spindle;
a load measuring device operative upon the ocurrence of a predetermined degree of load on said first power drive during a machining operation;
a feed rate controller actuated in response to operation of said load measuring device to effect a predetermined change in the output rate of said second power drive for effecting a corresponding change in the feed rate of said work support for a predetermined interval;
and switch control means operable to deactuate said feed rate controller for rendering said second power drive operative to move said work support at a selected feed rate.

5. In a machine tool control system;
a pair of relatively movable members;
a pair of separate power driven variable speed transmission mechanisms respectively operable to move said members at predetermined speed rates for performing a machining operation;
a load measuring device inoperative during a normal machining operation but actuated by a predetermined degree of load on one of said variable speed transmissions;
and a rate regulator disconnected and separate from said variable speed transmission, but connected upon actuation of said load measuring device for predeterminately reducing the rate of one of said variable speed transmission mechanisms.

6. In a machine tool;
a pair of relatively movable members respectively adapted to carry a rotatable cutting tool and a workpiece for performing a machining operation during cooperative, relative movement at predetermined rates;
a first selectively presettable power driven variable speed transmission operative to rotate a cutting tool carried by said associated member at a predetermined rate;
a second selectively presettable power driven variable speed transmission operative to move said other member at a predetermined feed rate;
a load responsive device disposed to be actuated upon the occurrence of a predetermined degree of load on said first variable speed transmission;
a rate control device actuatable to selectively adjust the rate of said second variable speed transmission whenever said load control device is actuated for effecting a corresponding change in the rate of said other member;
and automatic control means connected to deactuate said rate control device after a predetermined interval.

7. In a machine tool having a rotatable cutter receiving spindle and a relatively movable work support;
a first variable speed power drive connected to rotate said spindle for rotating a cutter carried thereby at a predetermined speed rate;
a second variable speed power drive connected to move said work support at a presettable selected feed rate for moving a workpiece carried thereby into machining engagement with a cutter carried by said tool spindle;
a load measuring device connected to said first power drive for actuation in response to a predetermined abnormal degree of load thereon during a machining operation;
and rate adjusting means operative to predeterminately adjust said second variable speed power drive, said rate adjusting means being normally disconnected therefrom, but being connected thereto upon actuation of said load measuring device for effecting a corresponding adjustment in the feed rate of said work support.

8. In a machine tool;
a frame;
a cutter receiving tool spindle journalled to rotate in said frame;
a variable speed hydraulic power drive system connected to rotate said tool spindle at a selected speed rate;
a relatively movable worktable adapted to support a workpiece for selective movement into machining engagement with a cutter carried by said rotating spindle;
a variable feed drive mechanism presettable to move said worktable at a selected non-variable, normal feed rate to move a workpiece carried thereby at the corresponding rate for performing a machining operation;
a pressure switch connected in said hydraulic drive system and actuatable on the occurrence of an abnormal predetermined degree of load on said tool spindle during a machining operation; and,
a rate controller operative in response to actuation of said pressure switch to predeterminately adjust said feed drive mechanism for moving said worktable at a different preselected rate and for reducing the resultant load on said variable speed hydraulic power drive for said tool spindle.

9. In a machine tool having a selectively rotatable tool receiving spindle and a relatively movable work support operative to move a workpiece relative to a cutter carried by said spindle for performing a machining operation;
separate variable speed mechanisms individually presettable and respectively operative to rotate said spindle and effect relative movement of said work support at predetermined relative rates to perform a machining operation;

a load control device connected to be actuated upon the occurrence of a predetermined load on one of said variable speed mechanisms during a machining operation;

a rate controller connected to effect a predetermined reduction in the rate of the other of said variable speed mechanisms upon actuation of said load control device; and control switch means operative to disconnect said rate controller after a predetermined interval.

10. In a machine tool having a rotatable tool spindle and a relatively movable work support;

a hydraulic drive system operative to rotate said spindle at a preselected rate;

a variable speed feed drive mechanism operative to move said work support at a preselected feed rate for moving a workpiece carried by said work support into cutting engagement with a cutter carried by said tool spindle;

a tape control system operative to control the rate of operation of said hydraulic drive system and said variable speed drive mechanism;

a pressure switch interconnected in said hydraulic control system and being preset for actuation upon the occurrence of a predetermined load on said drive system during a machining operation;

a feed rate controller actuatable to reduce the preselected feed rate of said variable feed drive mechanism upon actuation of said pressure switch for reducing the load on said spindle by effecting relative feeding movement of said work support at a predetermined reduced rate; and, control means responsive to said tape control system operative to deactuate said feed rate controller.

11. In a machine tool having a rotatable tool spindle and a cooperative relatively movable work support;

separate variable speed transmissions respectively presettable to rotate said spindle and effect relative movement of said work support to effect a machining operation on a workpiece carried thereby;

a program control system operative to selectively preset both of said transmissions for rotating said spindle and moving said work support to perform a machining operation;

a feed reducing apparatus selectively operative to reduce the rate of movement of said work support a predetermined amount irrespective of the preset adjustment of said associated variable speed transmission in response to said program control system;

a controller operative on the occurrence of a predetermined degree of load on said spindle during a machining operation to actuate said speed reducing apparatus for reducing the rate of movement of said work support; and, means actuated by said program control system operative to deactuate said speed reducing apparatus.

12. In a machine tool;

a work support adapted to carry a workpiece at a selected feed rate;

a rotatable spindle adapted to carry a cutting tool for engaging a workpiece carried by said relatively movable work support for performing a selected machining operation;

a hydraulic motor presettable to drive said spindle at a selected rate;

a separate presettable feed drive operative to move said work support at a predetermined feed rate for moving a workpiece carried thereby into machining engagement with a cutting tool carried by said tool spindle;

a program control system operative to preset said hydraulic motor and said feed drive;

feed control means actuatable to reduce the feed rate effected by said feed drive in response to a predetermined degree of load on said spindle motor;

and means operative in response to said program control system connected to deactuate said feed control means.

13. In a machine tool having a rotatable tool carrying spindle and a cooperatively disposed work support adapted to support a workpiece for a machining operation;

a first power drive operative to rotate said tool spindle at a selected speed rate;

a second power drive operative to effect relative feed movement of said work support for selectively moving a workpiece carried thereby into machining engagement with a cutting tool carried by said rotating tool spindle;

a program control system operative to control said machine tool throughout a selected program of machining operations, said program control system being operative to selectively control the operation of said first and second power drives;

a load measuring device operative to be actuated upon the occurrence of a predetermined degree of load on said first power drive during a machining operation;

a feed rate controller actuatable in response to actuation of said load measuring device for effecting a predetermined reduction in the output rate of said second power drive for reducing the feed rate of said work support for a predetermined interval;

a switch controller predeterminately operated by said program control system for deactuating said feed rate controller to render said second power drive operative to move said work support at a selected feed rate determined by said program control system.

14. In a machine tool having a rotatable cutter receiving spindle and a relatively movable work support;

a first variable speed power drive actuatable to rotate said spindle for rotating a cutter carried thereby at a predetermined speed rate;

a second variable speed power drive actuatable to move said work support at a selected feed rate for moving a workpiece carried thereby into machining engagement with a cutter carried by said tool spindle;

a program control system cyclically operative to individually preset said first and second power drives for each individual machining cycle of a plurality at cycles of operation at respectively predetermined rates preselected for each cycle of operation;

a function start controller operated by said power control system upon completion of a cyclic presetting operation thereby for actuating said first and second power drives to respectively rotate said spindle and move said work support at rates preset by said program control system;

a load measuring device connected to said first power drive for actuation in response to a predetermined degree of load on said tool spindle during a machining operation;

rate adjusting means actuatable to predeterminately adjust said second variable speed power drive in response to actuation of said load measuring device for effecting a corresponding adjustment in the feed rate of said work support;

function complete means operative upon completion of a cycle of machine movements initiated by said function start controller to reactuate said program control system for presetting said first and second power drives for a next cycle of machine operation; and, switch control means connected to deactuate said rate adjusting means in response to the next operation of said function controller.

15. In a machine tool having a rotatable tool carrying spindle and a cooperatively movable work support adapted to carry a workpiece for relative movement to a tool in said tool spindle for performing a machining operation;

a first power driven variable speed transmission presettable for selective actuation to rotate said tool spindle at a predetermined rate of speed;

a second selectively variable speed power driven transmission presettable for selective actuation to move said work support at a selected feeding rate for performing a machining operation;

a numerical control system including a control tape operative to preset both of said transmissions for respectively rotating said tool spindle and moving said work support at predetermined rates to perform a machining operation;

a load measuring device connected to be actuated during the occurrence of a predetermined degree of load on one of said transmissions;

a preset feed rate controller connected to be actuated for selectively adjusting the output speed rate of the other of said variable speed transmissions upon the initial actuation of said load measuring device;

and a separate control operated by said numerical control system for reactuating said feed rate controller.

16. In a machine tool control system;

a pair of relatively movable members one of which is a rotatable tool spindle;

a pair of separate power driven variable speed transmission mechanisms respectively operable to effect relative movement between said members at predetermined rates and to rotate said tool spindle at selected speed;

a cutter carried by said tool spindle disposed to engage a workpiece carried by the other of said members for performing a machining operation;

a control system operative to coordinately preset said transmission mechanisms for performing a selected machining operation;

a load measuring device connected to be actuated by a predetermined degree of load on one of said variable speed transmissions during a machining operation;

a preset feed rate regulator actuatable in response to actuation of said load measuring device for predeterminately reducing the rate of the other of said variable speed transmissions irrespective of the selected speed thereof;

and means responsive to said control system operative to deactuate said preset feed rate regulator.

17. In a machine tool;

a frame;

a cutter receiving tool spindle journalled to rotate in said frame;

a selectively variable speed hydraulic power drive presettable for actuation to rotate said tool spindle at a selected speed rate;

a relatively movable worktable adapted to support a workpiece for selective movement into machining engagement with a cutter carried by said rotating tool spindle;

a selectively variable feed drive mechanism presettable for actuation to move said worktable at a selected feed rate to move a workpiece carried thereby at a corresponding rate for performing a machining operation;

a program control system actuatable to preset said hydraulic spindle drive system and said feed drive system for actuation at the preset rates during the next cycle of machine operation;

a function start controller connected to be actuated by said program control system upon completion of a presetting operation thereby, said function start controller being operative when actuated to effect actuation of said hydraulic spindle drive and said feed drive mechanism for initiating the next cycle of machine operation at the programmed preset rates;

a pressure switch connected in said hydraulic power drive for said spindle and actuatable on the occurrence of a predetermined degree of load on said spindle during a machining operation;

a feed rate modifier actuatable in response to actuation of said pressure switch to predeterminately modify the present adjustment of said feed drive mechanism for moving said worktable at a different preselected rate during the existing cycle of machine operation;

a function complete controller actuated upon completion of the programmed cycle of machine operation for actuating said program control system to preset said hydraulic drive system and said feed drive system; and, a cycle complete control responsive to subsequent actuation of said function start controller for deactuating said feed rate modifier.

18. In a machine tool, means for operating a tool in a cutting operation, means for creating relative feed movement between the tool and the work, control means for adjusting the rate of operation and the feed for normal operation with a particular tool, modifying means disconnected from said control means during normal operation, but adapted to be connected for reducing the adjusted rate and, means actuated by an abnormal overload to connect said modifying means.

19. In an automatic machine tool including, a programming medium for issuing commands in the operation of the machine tool, adjustable means for actuating a tool in a cutting operation, means controlled by said medium for adjusting said adjustable means for normal operation with a particular tool and, means connectable to said adjustable means for modifying said adjustable means when an abnormal operation creates an overload.

20. A machine as in claim 19 wherein, said programming medium is arranged in blocks of commands and, means to insure the disconnection of said modifying means at the end of each block of commands.

21. In a machine tool, means for operating a tool for a cutting operation, means for creating a feed movement between the tool and the work, means for adjusting said means for normal operation with a particular tool, and means inactive during a normal operation but rendered active by an abnormal operation for adjusting said means for an operation less than normal.

22. In a machine tool, a spindle, drive means to rotate said spindle, a work support, means to move said work support along a plurality of axes at presettable rates, said means including separate means for each axis, overload means associated with said drive means and constructed to be actuated in the event of an overload on said drive means and, a rate modifier associated with each of said separate means and actuated by said overload means to reduce the rate.

23. In a machine tool adapted to provide a plurality of tools and selectively mount them in a tool spindle, a spindle including a variable drive therefor, a worktable including a variable drive therefor, a programming medium adapted to issue commands for selecting and mounting the selected tools, means under the control of said medium for setting the rates of the spindle and worktable drives for each selected tool for a machining operation under normal conditions and, an overload mechanism actuated upon the occurrence of an abnormal condition for reducing said set rates.

References Cited by the Examiner
UNITED STATES PATENTS
2,905,411 9/1959 Poundstone ---------- 77—32.7
3,247,912 4/1966 Reynolds ------------ 77—32.7

WILLIAM W. DYER, JR., *Primary Examiner.*

G. A. DOST, *Assistant Examiner.*